Dec. 11, 1962     M. HIMMELHEBER ET AL     3,067,456
APPARATUS FOR PRODUCING PRESSED WOOD-PARTICLE PANELS
Original Filed Oct. 5, 1953     6 Sheets-Sheet 1
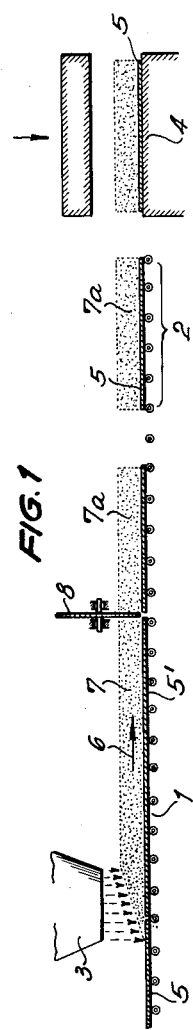
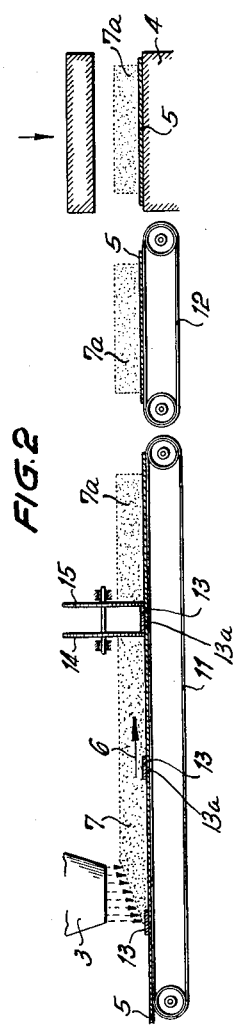
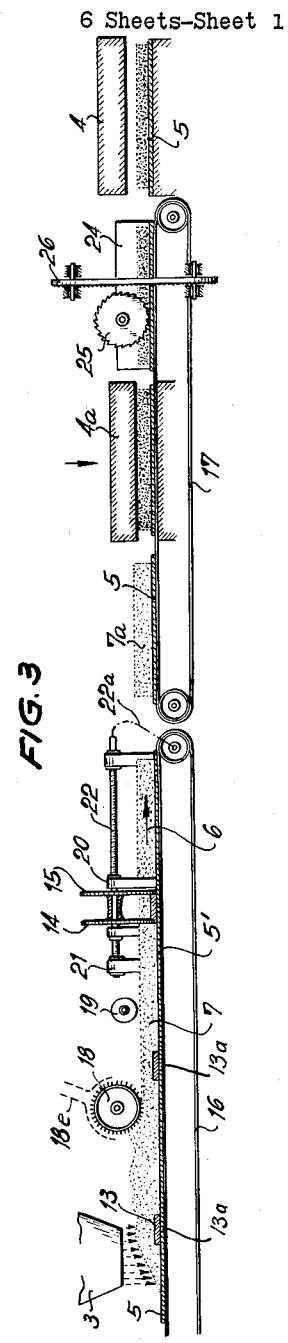

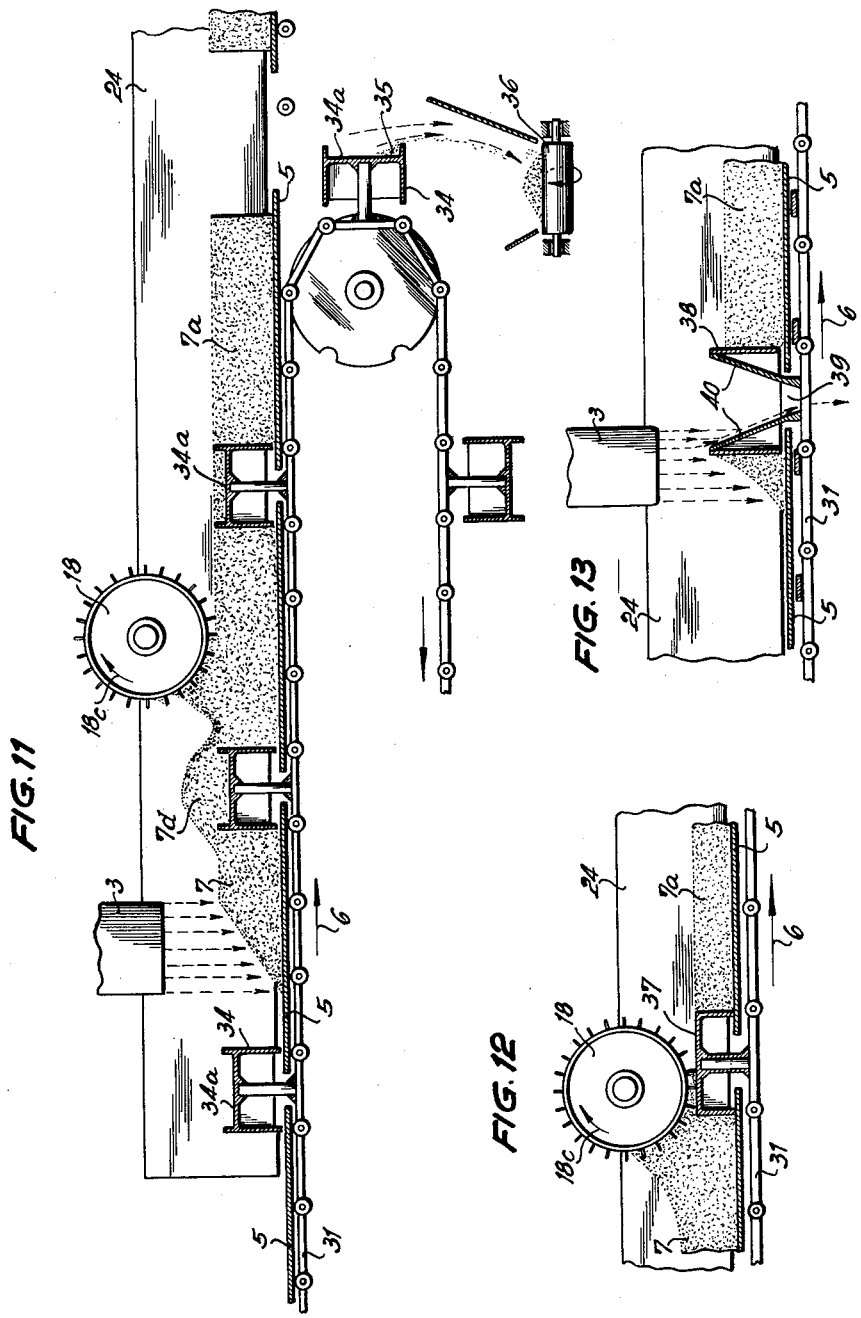

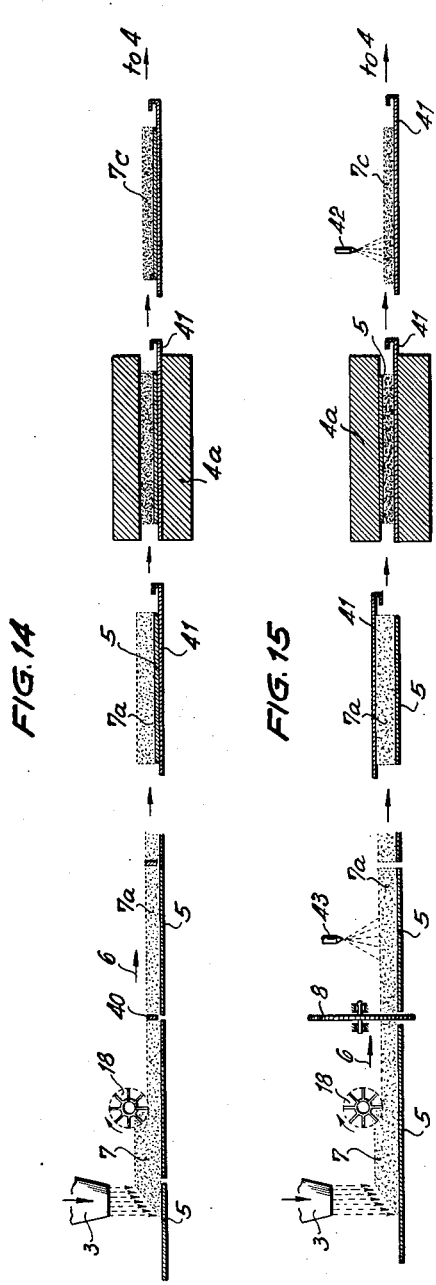

3,067,456
APPARATUS FOR PRODUCING PRESSED WOOD-PARTICLE PANELS

Max Himmelheber, Baiersbronn, Klaus Steiner, Bad Tolz, Upper Bavaria, and Walter Kull, Freudenstadt, Germany, assignors to Allwood Incorporated, Glarus, Switzerland, a corporation of Switzerland
Original application Oct. 5, 1953, Ser No. 384,168, now Patent No. 2,923,030, dated Feb. 2, 1960. Divided and this application Dec. 8, 1959, Ser. No. 858,225
Claims priority, application Germany Dec. 23, 1952
5 Claims. (Cl. 18—4)

This application is a division of U.S. application Serial No. 384,168, filed October 5, 1953, filed by Himmelheber, Steiner and Kull, now Patent 2,923,030, granted Feb. 2, 1960.

The invention relates to apparatus for the manufacture of boards or panels from wood-particle material, and more particularly to the so-called "dry" manufacture of such products from binder-impregnated wood shavings that are first shaped to a mat and then condensed and solidified into a solid panel by subjecting the mat to pressing or hot pressing.

The conventional dry manufacture of wood-particle boards is a discontinuous one. The fibrous stock, consisting preferably of wood shavings and/or other fibrous organic materials, such as comminuted straw, reed, bamboo, wood scales and the like, is poured into a frame resting upon a metal sheet so as to cover the framed sheet area as uniformly as possible, and the properly dimensioned mat of interlaced particles remaining on the sheet after removal of the frame is passed into the press together with the sheet.

Attempts have been made to improve the economy of manufacture and the uniformity of the panel products by substituting the intermittent supply of stock onto individual supporting sheets by a continuous mat-forming method according to which the particle stock is continuously deposited upon a travelling endless conveyor belt. Thereafter the continuous mat of particles thus formed on the belt is cut into individual portions, and each of these portions is individually transferred from the conveyor belt onto a supporting metal sheet on which the mat portion is pressed into a panel, usually, in an intermittently operating press. The transfer of the mat portions from the conveyor to the supports of sheet metal is dfficult and troublesome. The transfer is virtually impossible as long as the mat portion is still in its loosely deposited condition. It is necessary, therefore, to condense or pre-press the mat material prior to the transfer, and it has been found that even then the mat portions remain fragile and are apt to be damaged, aside from the fact that spacious and complicated devices are needed for effecting the transfer. If the pre-pressing is performed with intermittently operating presses, then it is also necessary to first cut the mat material to the proper length, and this requires composing the endless conveyor belt of individual belt sections between which the particle mat can be cut, thus involving an intricate conveyor design in addition to devices for re-transferring the pre-pressed mat portion onto the conveyor leading to the main press.

It is an object of our invention to obviate these disadvantages and to devise a manufacture that affords a continuous depositing and forming of a wood-particle mat and a subsequent transfer of properly dimensioned mat portions to the pressing machinery without the danger of the mat portions becoming damaged when being conveyed. Another object, akin to the foregoing, is to improve the economy of manufacture by minimizing the number of rejects due to damage occurring during the transfer, and by simplifying the machinery needed to effect the transfer. A further, optional object of our invention is to do away, if desired, with the above-mentioned intermittent pre-pressing of the mat portions.

To achieve these objects, and in accordance with a feature of our invention, we start the mat forming procedure by conveying a series of consecutive supporting plates, preferably of sheet-metal, through a mat forming station in which the series of sheets is continuously charged with wood particles so that a mat of particles is formed directly upon the travelling supports; and we cut or otherwise divide the travelling mat along the butt junctions or gaps of the supporting sheets into individual mat portions that are substantially or approximately coextensive with the respective sheets and remain supported by the sheets until the indivividual mat portions reach the pressing stage of the fabricating process or until after they have passed through the press.

Within this method, the individual sheet-metal supports of the series may abut against each other, and the particles may be deposited over the entire length, up to the abutting edges, of the supports. Then, however, caution is needed to prevent the panel press from becoming excessively soiled by wood particles falling off the supports when passing them into or out of the press. For that reason, and according to another feature of the invention, we prefer giving the sheet-metal supports a larger length in the traveling direction than required for the mat portions, and/or space the supports in that direction from each other. As a result, an amount of particle stock is deposited upon the marginal areas intermediate each two mutually adjacent supports, and this excess amount of stock is thereafter removed to be available for re-processing. The removal of the excess stock may be effected, for instance by severing the mat along two parallel cuts and thereafter removing the piece of mat thus cut off the remaining mat portions.

For facilitating the removal of the cut-off mat pieces, we prefer covering the marginal zones of the supports along the mutually adjacent edges with a cover structure, such as a strip of sheet metal, together with which the cut-off mat piece can be readily discarded.

The machinery needed for the above-described method according to the invention is considerably simpler than the manufacturing equipment heretofore used for the production of wood-particle boards according to the dry process. The machinery according to the invention comprises a conveyor, such as a belt conveyor of the endless type, which during continuous operation carries a series of sheet-metal supports through a mat forming station. The mat forming station is provided with a wood-particle supply device located above the travelling supports and extending across the width of their travelling path. This device continuously deposits a mat of stock upon the series of supports. Further provided are dividing means which sever the mat into a number of mat portions whose dimensions correspond substantially to those of the panels to be produced. The dividing means travel with the conveyor so that the subdivision is effected while the deposited stock is in continuous motion. The dividing means may consist of one or several saws whose carriage travels periodically with the conveyor to thereafter return to the initial position in order to repeat the cutting operation. The position of the saws or other dividing means is such that the lines of division extend close to the mutually adjacent edges of each two neighboring supports.

The foregoing objects and features of our invention will be apparent from, and will be desired in connection with the embodiments of our invention exemplified on the drawings.

FIGS. 1 and 2 show schematically different modifications of the method according to the invention.

FIG. 3 shows a fabricating plant according to the invention.

FIGS. 8 to 13 show different modifications respectively of the forming stage pertaining to a fabricating plant otherwise designed and operative in accordance with the embodiments of FIGS. 1 to 7.

FIGS. 14 and 15 show schematically two other examples of fabricating plants and are essentially explanatory of further modifications of the method according to the invention.

The same reference characters are used in the various illustrations for denoting respectively similar elements.

Figure 4:
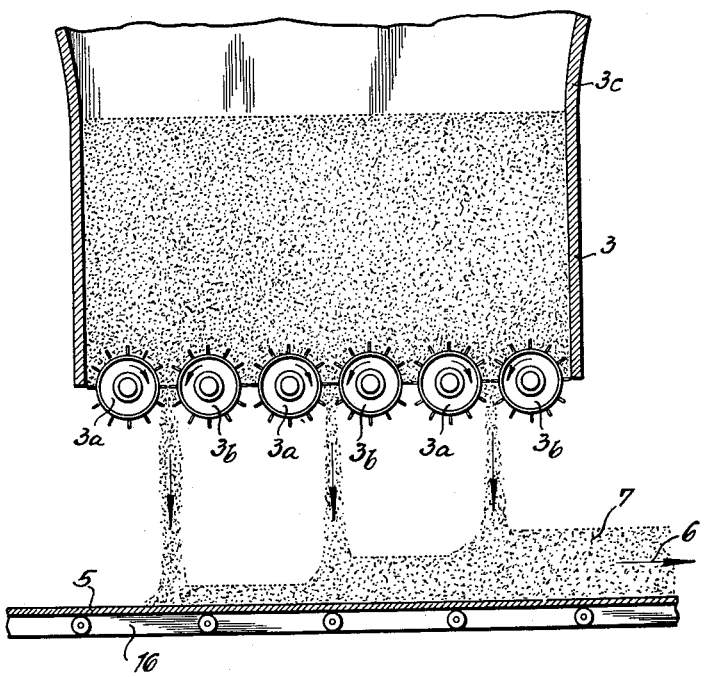
FIGS. 4 to 7 illustrate different details respectively of the same plant.

The plant shown in FIG. 1 comprises a conveyor runway composed of a first conveyor 1 and an aligned second conveyor 2, both conveyors being shown as of the roller type. The rollers of conveyor 1 are driven at a slower speed than the rollers of conveyor 2. The conveyor 1 passes through a mat forming station equipped with a particle dispensing device 3. The complete conveyor runway extends from device 3 to an intermittently operating molding press 4. When in operation, the runway portion formed by conveyor 1 is substantially covered by a series of sheet-metal supports 5 which, in the embodiment of FIG. 1, almost abut against each other. The gap is indicated at 5′. The supports 5 travel slowly in the direction 6 beneath the supply device 3 from which they are loaded with a mat 7 of particle stock. A circular saw 8 travels periodically with the supports 5 in the conveying direction 6 and cuts through the continuous mat 7 at a place between two adjacent supports 5. As a result, a mat portion 7a is divided from the mat 7. When the cut is completed, the saw 8 moves back to its starting place and commences to cut the mat 7 ahead of the next following support 5.

When the most advanced support 5 with a mat portion 7a on conveyor 1 reaches the conveyor 2, the support is advanced at a higher speed toward and into the press 4. Consequently, the foremost support 5 and the mat portion 7a carried thereby are removed from the series of supports 5 remaining on the conveyor 1. The pressing operation is completed before the next individual support and mat portion reach the press 4.

It will be recognized that the mat is continuously formed on the series of supports and that the mat portions when cut from the rest of the mat remain on the same supports during the transfer from conveyor 1 to the press 4 as well as during the pressing operation. Upon completion of the pressing operation, the mat of wood particles is either formed into a solid panel or is sufficiently solidified for further fabrication, and the support 5 is now available for being returned to the starting point of the conveyor runway.

The particle stock is impregnated with a resinous or other binding agent before it reaches the bin or hopper of the supply device 3. The pressing operation in press 4 has the effect of condensing the particle stock thus reducing it to the desired thickness of the panel and solidifying it by virtue of the binder contained in the mat material. The pressing operation may involve a simultaneous application of heat for curing the binder, as customary in such processes. The proportion of binder per total weight of stock may amount up to about 8% and is usually below 5%.

In the modification according to FIG. 2, the two consecutive conveyors 11 and 12 are of the endless-belt type. The gaps 13a between adjacent edges of the supports 5 are covered by strips 13 of sheet metal. In further distinction from the embodiment of FIG. 1, the division of mat 7 into individual mat portions 7a is effected by means of two parallel saws 14 and 15 which are rotatably mounted on a common carriage and operate as described above with reference to the saw 8 of FIG. 1. The two saws 14 and 15 cut along the two edges of each individual cover strip 13 that extend transverse to the direction 6 of conveyor travel. Consequently, when the saws 14 and 15 have completed a cutting operation, an intermediate piece of mat, resting upon the cover strip 13, is severed from the mat 7 and can thereafter be removed by eliminating the cover strip 13 from the supports. In all other respects, the design and operation of the embodiment according to FIG. 2 are in accordance with the foregoing description of FIG. 1.

In the manufacture of pressed wood-particle panels, the supporting caul plates must be accessible at the edges in order to hold and convey them to and from the presses. When a single transverse cut is used for subdividing the originally continuous mat of particles, this cut must pass through the gap, or must be located above the gap, between two successively adjacent supporting plates. Hence, after severing of the mat, the caul plate cannot be gripped and conveyed without damage to the still loosely textured mat portion supported by that plate. Consequently, a subsequent grinding or other finishing operation would be necessary to restore a straight edge on the finished boards.

According to the invention, two parallel saws are provided so as to make two cuts along the two respective sides of the transverse gap between two adjacent caul plates. As a result the strip of mat severed and removed from the mat is wider than the gap, so that a marginal surface area remains bare on the caul plate and the supported, cut-off mat portion is set off from the edge of the plate. The plate therefore can readily be handled, by holding tools or other material-handling devices, without any need for such devices to touch the mat portion. As a result easier handling and better products are secured without necessity for subsequent finishing of the edges.

As will be explained in a later place with reference to FIG. 4, the stock supply device 3 can be given such a design and operation that the quantity of stock deposited on the supports is in accordance with that needed for the mat 7. However, we preferably conduct the method according to the invention in such a manner that continuously a larger quantity of stock is discharged onto the supports than correspond to the volume and thickness of the mat portions 7a. This requires providing the forming station with mechanical dosage control means, such as stripping or wiping members, which remove the excessive amount of stock down to the desired thickness of the mat, the removed amount of particles being returned to the supply device. The stripping members may consist of rotating spike drums, combs, rakes, tools similar to milling cutters or the like devices that are preferably adjustable as to their vertical spacing from the supports. The stripping means are located ahead of the transversely cutting saws.

The forming station may further be equipped with a pre-condensing or smoothing device consisting, for instance, of one or several rollers. The pre-condensing serves to exert only slight pressure upon the surface of the mat to somewhat condense its texture and smooth its surface prior to subjecting the mat to the cutting operation.

According to another feature of the invention, we trim the edges of the mat portions along the travelling direction by trimming devices such as saws during the conveying travel after the mat portions are severed from the rest of the mat. The trimming devices may be disposed along the runway beyond the conveyor that carries the series of sheet-metal supports through the forming station. However, the trimming devices may also be disposed between a pre-pressing machine and the main panel press, if the plant is equipped with pre-pressing machinery.

The manufacturing plant illustrated in FIGS. 3 to 7 incorporates the just-mentioned features of the invention. The plant is equipped with two conveyors 16 and 17 of the endless-chain type. Conveyor 16 carries a series of supports 5 with intermediate cover strips 13 along a stock supply device 3. The mat 7 thus formed on the series of supports is transversely severed by two saws 14 and 15 as explained with reference to FIG. 2. The individual mat portions 7a then reach the conveyor 17 which passes them at higher speed toward the intermittently operating panel press 4.

The supply device 3 may be given a design as schematically illustrated in FIG. 4. This device has a hopper or bin 3c which is kept sufficiently filled with binder-impregnated particle stock. The bottom opening of the bin is substantially covered by a large number of roller pairs of which only three pairs are illustrated. The two rollers 3a and 3b of each pair revolve downwardly at their common tangential area. Consequently, a small amount of stock is discharged between the two rollers of each pair. Each roller extends across the entire width of the supports 5 and is provided with a large number of peripherally and axially distributed spikes which tear some of the material out of the mass contained in the bin. As a result, a uniform veil of wood particles is discharged between the rollers of each pair as the supports pass beneath the supply device at a uniform speed. The amount of discharged material can be regulated by varying the revolving speed of the rollers 3a and 3b. The individual discharges are super-imposed upon each other to form the mat 7.

As mentioned, the supply is preferably so regulated that the thickness of the deposited mat 7 is larger than desired of the mat portions 7a. The excess material is brushed or stripped from the mat by means of a raking device. According to the embodiment of FIG. 3, this device consists of a spike drum 18 which revolves at a peripheral speed much higher than the speed of conveyor travel. The rake drum 18 is shown to be upwardly covered by a housing 18e to which an exhaust blower may be connected for discharging the excess particles. Instead of providing for excess removal by exhaust, or preferably together therewith, the axis of rotation on device 18 may be located at an angle to the travelling direction (arrow 6) of the conveyor as is shown in FIG. 5.

Figure 5:
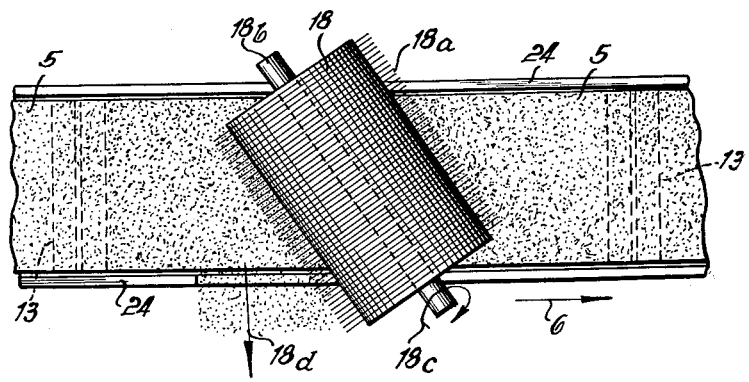

According to FIG. 5, the device 18 consists of a drum provided with a multitude of spikes 18a and mounted on a shaft 18b which extends at an angle to the conveyor direction 6. The sense of rotation of device 18 is represented by an arrow 18c. When rotating at high speed, the major amount of eliminated particles is thrown laterally off the supports 5 in the direction of the arrow 18d. As explained, the shaft 18b is preferably made vertically adjustable in order to vary the spacing of the drum from the supports 5 in accordance with any desired thickness of the mat portions.

The stripping device operates essentially as a means of giving the particles a proper dosage and of securing a uniform thickness of the mat portions to be pressed. This secures also the desired uniform weight of the panel products. The stripping device may also serve to impart to the mat portions a desired smooth and uniform surface condition. However, to improve the mat surface and also for somewhat condensing the mat texture, the plant shown in FIG. 3 is further equipped with a condensing roller 19 that extends transversely of the mat and is located between the stripping device 18 and the saws 14, 15.

The saws 14 and 15 are revolvably mounted on a carriage 20 which is displaceable upon a stationary supporting structure 21 in the conveying direction by means of a transmission schematically represented by a screw spindle 22 geared to the drive of conveyor 16 as indicated by a dot-and-dash line 22a. During the cutting operation of saws 14 and 15, the transmission 22 moves the saws in the conveying direction at the conveying speed. Upon completion of the cut, the transmission returns the saws to the original position by suitable reversing means (not illustrated).

The mat portions 7a, when reaching the second conveyor 17, are rapidly advanced into an intermittently operating press 4a.

While in the plants according to FIGS. 1 and 2 the press denoted by 4 may consist of a pre-press or, for instance, of a single-stage hot press such as a high-frequency-heated plunger press, the pressing device 4a shown in FIG. 3 serves to perform a preliminary pressing operation for densifying the mat portion prior to the main pressing operation. As a rule, the pre-press 4a is not heated. After leaving the pre-press 4a, the partially compressed mat portions pass on a conveyor 17 into the main panel press 4 consisting of a single-stage hot press, or of a multiple-stage press with heated press plates and the pertaining charging and discharging accessories.

While passing from pre-press 4a to main press 4, the mat portions 7a pass through edge-trimming devices which comprise two saws 25 and 26 that cut along the edges of the supports 5 in the direction of conveyor travel. While we consider it preferable to locate the edge-trimming devices between the pre-press and the main press, it will be understood that the edge-trimming operation may also be performed at a different point of the runway, for instance, ahead of or shortly subsequent to the mat-severing operation.

According to another feature of the invention, the conveyor at which the edge-trimming devices are located has preferably a total width larger than that of the sheet-metal supports 5 and forms a small gap on both respective sides of the supports in the conveying direction. This laterally extended conveyor assembly is charged with particle stock over its entire width so that the mat leaving the forming station is wider than the supports 5. When the mat portions cut from this mat travel through the trimming devices, the trimming tools passing through the above mentioned gaps trim the lateral margin off the remaining mat portions while these portions are still carried by the sheet-metal support on the conveyor.

According to a more specific feature of the invention, the just mentioned conveyor assembly is formed by an endless main conveyor whose width corresponds to that of the sheet-metal supports and by two lateral conveyors which form extensions of the main conveyor surface but are spaced therefrom so as to form a narrow gap traversed by the edge-trimming tools.

Figure 7:
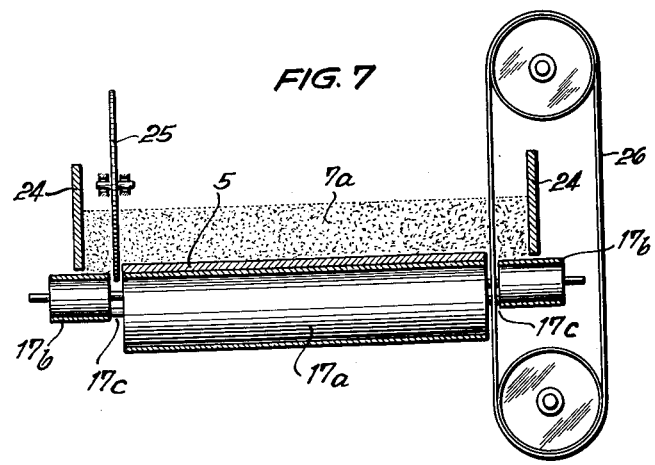

The above-mentioned features are embodied in the edge-trimming devices of the plant according to FIG. 3 and are separately illustrated in FIG. 7.

According to FIG. 7, the conveyor 17 is composed of a main conveyor 17a whose width corresponds to that of the sheet-metal supports 5. The top surface of conveyor 17a is laterally extended by narrow conveyors 17b so that two gaps 17c are formed between main conveyor 17a and respective lateral conveyors 17b. The mat-forming stock covers the entire active width of the conveyor surface between border walls 24. A circular saw 25 and an endless band saw 26 pass through the respective gaps 17c and trim the edges of the mat portion 7a while this portion is passing through the trimming station. The amount of stock trimmed off by the saws 25 and 26 may be removed from the lateral conveyors 17b to be returned into the fabricating process.

Figure 6:
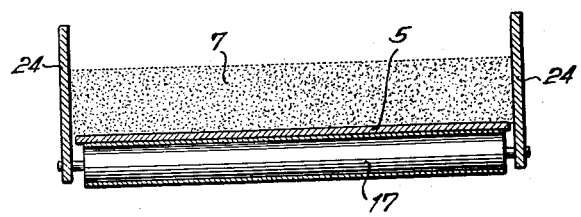

The just-mentioned lateral walls 24 may extend over the entire length or most of the length of the runway and may also be provided on both respective sides of the first conveyor 17 as is apparent from FIG. 6. The walls 24 are either stationary or they may travel with the conveyor.

The operating rhythm of the presses 4a and 4 is preferably such that a mat portion is being trimmed and introduced into the hot press 4 while the next following mat portion is being introduced into the pre-press 4a.

The cover strips 13 may be manually placed upon the supports 5 before the supports pass beneath the supply device 3. After each mat portion 7a is divided from the rest of the mat, the cover strips 13 may be manually removed. However, these operations may also be effected automatically and mechanically, for instance by connecting or coupling the cover strips with the endless conveyor.

While in the above-described embodiments of the invention the division of the mat material into individual mat portions is effected by means of cutting tools, the plant equipment, according to further features of the invention, can be improved and considerably simplified by dividing the deposited mat material with the aid of spacing and dividing structures that are placed upon the marginal gap zones of the sheet-metal supports and travel together with these supports through the forming station so as to either receive the amount of stock charged upon the marginal zones or to prevent these zones from being charged with stock. As a result, the spacing structures operate, alone or in combination with a stripping or levelling device, as a dividing tool that makes it unnecessary to subsequently cut the mat into individual portions. Embodiments equipped with such spacing and dividing devices will be described presently with reference to FIGS. 8 to 13.

Figure 8:
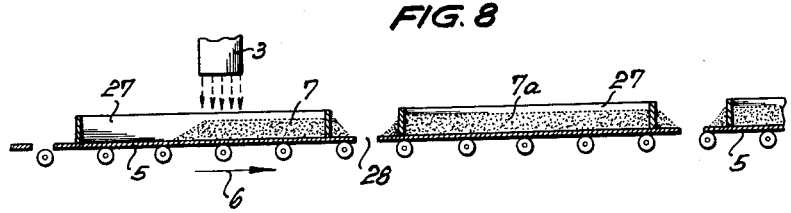

According to one possibility of embodying the just-mentioned features of the invention, a frame is placed upon each individual support to travel together therewith. The dimensions of the frame are in accordance with those of an individual mat portion. Thus, for instance, FIG. 8 shows part of a conveyor runway of a plant in which a frame structure 27 is placed upon each individual support 5 before the support reaches the supply device 3. When passing beneath the supply device, each frame is filled with stock up to the desired height so that the individual mat portions are directly produced and divided from the other portions during the continuous operation of the supply device. The amount of stock deposited upon the intermediate marginal zone between each two frames is thereafter removed. When the supports 5 do not directly abut against each other but form an intermediate gap 28, the stock may drop through the gap and through openings of the conveyor.

Another possibility of dividing the deposited stock into mat portions consists in placing upon the marginal zones of each two adjacent supports of the series a narrow structure that extends across the width of the supports and is preferably shaped as a box or trough. The box may be open at the top to receive the amount of stock deposited upon the marginal zone so that this excess amount can subsequently be removed by emptying the box structure.

Figure 9:
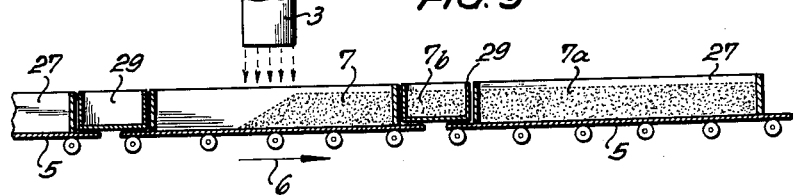

In FIG. 9, such box structures are shown at 29. Each box structure is inserted between two frames 27 according to FIG. 8. After a frame has passed by the supply device 3, the next following box structure 29 can be manually removed and the amount of stock 7b contained therein can be returned into the process. The box structure 29 is thereafter placed upon a gap zone of the supports 5 ahead of the supply device 3.

Such box structures may also be used without the application of the frames 27 as will be recognized from the embodiments described with reference to FIGS. 10 to 13. According to another feature of the invention, the dividing structures may be coupled or connected with the conveyor so that they empty themselves of the excess amount of stock during or at the end of their travel and thereafter automatically pass back to the starting point of the conveyor runway.

According to still another feature of the invention, the dividing box structures may be closed at the top to prevent the marginal zones of the supports from being covered with stock material. When providing the conveyor with stationary or movable border walls at both lateral sides as described with reference to walls 24 shown in FIGS. 3, 6, and 7, then the box structures regardless of whether they are open or closed at the top, may be open at the lateral sides adjacent to the border walls.

Figure 10:
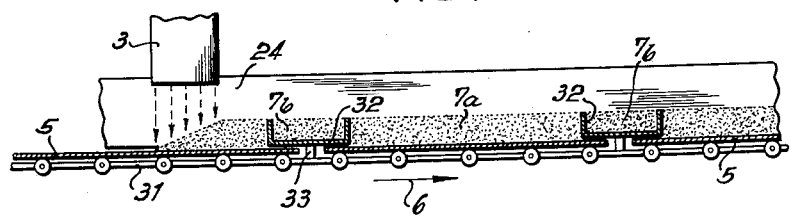

In the embodiment according to FIG. 10, the supports 5 are placed upon a conveyor 31 shown to be of the endless chain type. Connected with the conveyor chain are a number of evenly spaced troughs 32. In contrast to the embodiment of FIG. 9, the equipment according to FIG. 10 does not operate with travelling frames (27) and the troughs 32 are laterally open. The troughs cover the respective gaps between each two supports 5 and receive the amount 7b of stock deposited from device 3 onto the marginal gap zone. The distance between one trough and the next preceding or following trough corresponds to the desired length of the mat portion 7a to be formed. Stationary walls 24 are provided along both sides of the conveyor with a mutual spacing equal to the width of the mat portions. The sheet-metal supports 5 travel closely beneath walls 24 so that the marginal zone along each lateral edge of the supports is kept free of stock. The troughs 32 reach from one wall 24 to the other and hence slide between these two walls during the conveyor travel in the direction of the arrow 6. The space between the two walls 24 is uniformly filled with stock from the supply device 3. In a sufficient distance from the supply device 3, the sheet-metal support 5 most advanced on conveyor 31 passes upon the second faster operating conveyor (see conveyor 17 in FIG. 3) which pulls the support away from the next following trough, and transfers it to the pressing station, for instance to an intermittently operating pre-press as described above. The support, when reaching the second conveyor, therefore carries a mat portion of the desired width and length. The trough 32 is now emptied, for instance as shown in FIG. 11 for another device, and travels back to the starting point of the runway. Consequently, the process is performed mechanically without normally requiring any manual activities.

A stripping or dosing device as described with reference to FIGS. 3 and 5 may also be used with embodiments of the type shown in FIGS. 8 to 13. Such a device is shown at 18 in FIG. 11. Its drum rotates in the direction of the arrow 18c. When providing such a dosing device, it is preferable to keep the vertical walls of the troughs 32 (FIG. 6) slightly lower than corresponds to the height of the mat portion to be formed. If the equipment is to be used for producing mat portions of different thickness or of different material, then the trough walls are preferably made adjustable in height, for instance by giving them a telescopic or extensible design.

When providing a stripping or dosing device, the troughs may be given a shape as shown in FIG. 11. The bottom 34a of each trough 34 is raised so that the amount of material to be discharged at 35 is only a fraction of the amount that would have to be discharged at this place if the troughs were designed according to parts 32 in FIG. 10. In this case, however, the stripping device 18 must be capable of eliminating, at least temporarily, a relatively large quantity of stock since considerable quantities are deposited on top of the troughs as shown at 7d. At the discharge place 35 of the troughs, the material is thrown onto a suitable conveying device such as an endless conveyor 36 or a pneumatic conveyor which returns the material back to the supply device 3 or to storage or conveying equipment feeding the device 3. The same conveyor 36 may also serve to return the excess material eliminated from the conveyor by the stripping device 18. The troughs 34 may be given an adjustable height to permit adapting them to different respective thicknesses of the mat portions to be formed.

In the embodiment according to FIG. 12, the structures 37 are closed at the top so that they operate essentially as spacers rather than as troughs. The spacers determine the length of the mat portions and cooperate with lateral walls 24 in the above-described manner to keep a lateral edge portion on each side of the supports 5 free of stock material. The spacers 37 are preferably connected with the conveyor 31 so that they need not be moved manually. Behind the location of the supply device, each spacing structure 37 passes by a stripping device 18 rotating in the direction of the arrow 18c. The stripping device brushes over the top of the spacing structure 37 so that the mat portions 7a have the thickness determined by the height of the spacer structures. It will be recognized that in such a device, the spacer structures 37 cooperate with the stripping device 18 in the sense of a mat-dividing tool. The advantage of such a device lies in the fact that an excess of stock material occurs and is to be eliminated only at the stripping device. When the structures 37 reach the end of the conveyor travel, they return automatically to the starting point without discharging any stock. Consequently, a conveying device as shown at 36 in FIG. 11 is not needed. Spacer structures according to FIG. 12 may also be given an adjustable height.

According to another feature of the invention, the dividing structure placed upon the marginal gap zones of the supports, and to be used with or without frames of the type shown at 27 in FIGS. 8 and 9, may also be designed as a box-shaped narrow frame which is open at the top as well as at the bottom and which has a bottom portion above an opening in the conveyor. As a result, the amount of stock deposited onto the marginal zones can drain through the conveyor, preferably onto an auxiilary conveying device which is located beneath the conveyor of the forming station and serves to pass the stock material back into the fabricating process.

Such a dividing structure is shown at 38 in FIG. 13. The height of each structure 38 and its spacing from the adjacent dividing structures determine the thickness and length of the mat portion 7a to be formed. Each structure 38 extends between two lateral stationary walls 24 as described previously and has a bottom portion 39 that enters through the gap between two adjacent sheet-metal supports 5. The opening of bottom portion 39 registers with an opening of the conveyor chain. Consequently, the structure 38 forms a funnel that extends across the entire width of the mat and immediately discharges the stock material received from supply device 3 onto the gap zones of the supports. The stock draining from structure 38 is removed by a conveyor (not shown) located beneath the conveyor 31 and serving to pass the material back to the supply device. Consequently, a conveyor corresponding to conveyor 36 in FIG. 11 is not needed. It will be understood that a modification according to FIG. 13 may also be used in combination with a dosing or stripping device.

A particular advantage of the embodiment according to FIG. 13 lies in the fact that the elimination of the excessive amounts of stock occurs at the location of the supply device. This is desirable especially if the panels, and hence the mat portions, are to be composed of several layers of respectively different wood particles. For instance, the panel may be composed of an inner layer of coarse wood shavings and two surface layers of finer shavings selected for imparting to the panel an ornamental surface texture. The manufacture of such panels requires placing two or more stock supply devices along the conveyor of the forming station, and each supply device may be given its own stripping or dosing device. In plants of this kind, a device according to FIG. 13 discharges the excessive quantities of stock for each individual layer separate from those resulting from the other layers. Hence, each quantity can be returned to the one pertaining supply device. To some etxent the same advantage can also be obtained with a device according to FIG. 12. In contrast, however, when several supply devices are aligned along the same conveyor of the forming station to produce multiple-layer panels in the plants according to FIGS. 8 to 11, then the excessive amounts of stock discharged from the box-shaped or trough-shaped dividing structures at the end of the conveyor travel become mixed with each other and hence can be returned into the process only as a mixture.

For securing a reliable discharge of the stock material from the dividing structure 38 in a device according to FIG. 13, the slide surfaces 40 of the structure must be given a sufficient inclination. For that reason, such a structure may require a larger dimension in the conveying direction 6 than is needed in dividing structures according to FIGS. 8 to 12. Consequently, a dividing structure according to FIG. 13 is apt to cover a larger zone along the gap edge of each support 5 than otherwise necessary. This is not appreciable if the panels have a relatively large thickness. For that reason, a device of the type shown in FIG. 13 is preferable particularly for the manufacture of thick panels.

In plants according to FIGS. 8 to 13, the dimensions of the mat portions to be formed can readily be adapted to various requirements, for instance by correspondingly dimensioning the dividing or spacing structures, the frame structures, the spacing between the stationary walls laterally along the conveyor travel, or by a combination of such variations.

The method and machinery according to the invention may further be modified by placing each sheet-metal support 5 and the mat portion 7a formed thereon onto another supporting sheet (pressing sheet) which projects over the support 5 on all sides and with which the individual mat portion is introduced into an intermittently operating pre-press or main panel-forming press. According to another modification, relating to the method just described, the pressing sheet may be placed on top of the mat portion, and the resulting assembly, consisting of the support, the mat portion and the pressing sheet, may then be turned 180° so that the pressing sheet lies at the bottom before the mat portion enters into the press. The later modification makes it possible, if desired, to eliminate the original support before passing the mat portion into the press.

For instance, according to FIG. 14, in which the conveyor means are omitted, a series of supports 5 passes beneath and along a forming station in which a mat is deposited from a supply device 3 and is calibrated to the proper thickness by a stripping device 18 as described previously. The subdivision of the mat into individual mat portions is effected by means of spacer boards 40 which cooperate with the stripping device 18 in the same manner as explained above with reference to FIG. 12. The spacer boards 40 extend across the supports 5 and have only a slight width in the conveying direction (arrow 6) so that the individual mat portions 7a have substantially the same dimensions as the respective supports 5. After each carrier 5 and the mat portion 7a supported thereby are removed from the conveyor of the forming station, a pressing plate 41 is placed under the support 5. The pressing plate projects beyond the support 5 laterally as well as at the front and in the rear. The assembly 41, 5, 7a is then passed into the press 4a.

Instead of using spacer boards 40, a subdivision of the mat may also be effected by means of a saw 8 as shown in FIG. 15. FIG. 15 also illustrates the method according to which the pressing plate 41 is placed upon the top of the individual mat portion 7a. The assembly 41, 7a, 5 is thereafter reversed and then introduced into the press 4a. If desired, the original support 5 may be removed prior to passing the pressing sheet 41 with mat portion 7a into the press. Also shown in FIG. 15 are two rows of spray nozzles 42 and 43 which permit treating the two surfaces of the mat portion, for instance, if a certain amount of surface moistening is desired or if an additional amount of resinous or other binder is to be applied for obtaining a desired surface condition of the panel to be produced.

As apparent from the various embodiments described in the foregoing, the invention is amenable to various and diversified modifications, and it will be obvious to those

We claim:
1. An apparatus for the production of pressed wood-particle panels, comprising endless conveyor means, a plurality of supports removably carried by the conveyor means, bridging means overlying and overlapping a gap between two successive supports so as to define the corresponding edges of the panel forming material thereon, wood-particle discharging means to deposit a layer of particles on said supports as they are conveyed past said discharged means, means to remove surplus particles from the upper surface of said deposit to level the same, means for receiving each support as it leaves said conveying means and to press the layer into a panel, said bridging means being operably connected to the conveyor means for automatic removal before the rearward one of said two supports leaves the conveyor means and for automatic return for bridging a gap between succeeding plates that are to be conveyed toward the wood-particle discharging means, the bridging means comprising upwardly opening wood-particle receiving troughs having a lower opening for exit of surplus wood particles.

2. An aparatus for the production of pressed wood-particle panels, comprising endless conveyor means, a plurality of supports removably carried by the conveyor means, bridging means overlapping a gap between two successive supports, wood-particle discharging means to deposit a layer of particles on said supports as they are conveyed past said discharging means, means to remove surplus particles from the upper surface of said deposit to level the same, means for receiving each support as it leaves said conveying means and to press the layer into a panel, said bridging means being operably connected to the conveyor means for removal before the rearward one of said two supports leaves the conveyor means and for return for bridging a gap between succeeding plates that are to be conveyed toward the wood-particle discharging means, the bridging means comprising upwardly opening receptacles receiving surplus wood particles, and means to receive the surplus therefrom as each receptacle is removed for return for bridging a gap.

3. An apparatus for the production of pressed wood-particle panels, comprising endless conveyor means, a plurality of supports removably carried by the conveyor means, bridging means overlying and overlapping a gap between two successive supports, wood-particle discharging means to deposit a layer of particles on said supports as they are conveyed past said discharging means, means to remove surplus particles from the upper surface of said deposit to level the same, means for receiving each support as it leaves said conveying means and to press the layer into a panel, said bridging means being operably connected to the conveyor means for removal before the rearward one of said two supports leaves the conveyor means and for return for bridging a gap between succeeding plates that are to be conveyed toward the wood-particle discharging means, the briging means comprising upwardly opening receptacles.

4. The apparatus defined in claim 3, said receptacles each comprising a downwardly tapering trough portion having a lower exit portion extending between each two succeeding supports, for discharge of wood particles below said supports, and each receptacle further comprising two transverse portions extending downwardly, respectively forwardly and rearwardly of said trough portion, and toward the upper surfaces of successive supports and inwardly of the forward and rearward edges of said supports, so as to leave edge portions of said supports free of wood particles.

5. An apparatus for the production of pressed wood-particle panels, comprising endless conevoyor means, a plurality of supports removably carried by the conveyor means, bridging means overlying and overlapping a gap between two successive supports so as to define the corresponding edges of the panel-forming material thereon, wood-particle discharging means to deposit a layer of particles on said supports as they are conveyed past said discharging means, means to remove surplus particles from the upper surface of said deposit to level the same, means for receiving each support as it leaves said conveying means and to press the layer into a panel, said bridging means being operably connected to the conveyor means for automatic removal before the rearward one of said two supports leaves the conveyor means and for automatic return for bridging a gap between succeeding plates that are to be conveyed toward the wood-particle discharging means, the bridging means comprising upwardly opening wood-particle receiving troughs having a lower opening for exit of surplus wood particles below said supports, the bridging means each having two transverse portions extending downwardly toward the surfaces of successive supports, and inwardly of the forward and rearward edges of said supports, so as to leave edge portions of said supports free of wood particles, said transverse portions being positioned a fixed distance above said conveyor means so as to permit insertion of edges of the supports below the transverse portions.

References Cited in the file of this patent
UNITED STATES PATENTS

| | | |
|---|---|---|
| 1,970,245 | Morse | Aug. 14, 1934 |
| 1,977,374 | Brooke et al. | Oct. 16, 1934 |
| 2,390,564 | Tedrow | Dec. 11, 1945 |
| 2,545,366 | Mandryl | Mar. 13, 1951 |
| 2,689,975 | Leng | Sept. 28, 1954 |
| 2,752,656 | Rutgers | July 3, 1956 |